United States Patent [19]
Goldsworthy et al.

[11] 3,873,399
[45] Mar. 25, 1975

[54] APPARATUS AND METHOD FOR PRODUCING ELONGATED REINFORCED PLASTIC ARTICLES

[75] Inventors: William Brandt Goldsworthy, Palos Verdes; Ethridge E. Hardesty, Pine Valley; Harald E. Karlson, Santa Monica, all of Calif.

[73] Assignee: Goldsworthy Engineering, Inc., Torrance, Calif.

[22] Filed: May 9, 1973

[21] Appl. No.: 358,665

[52] U.S. Cl. ............... 156/441, 156/180, 156/245, 156/500, 264/281, 264/310, 425/392, 425/395
[51] Int. Cl. .................... B32b 1/10, B32b 31/26
[58] Field of Search ........... 156/180, 245, 441, 500; 425/383, 385, 392, 394, 395; 264/281, 310

[56] References Cited
UNITED STATES PATENTS

| | | | |
|---|---|---|---|
| 2,871,911 | 2/1959 | Goldsworthy et al. | 156/441 |
| 3,442,739 | 5/1969 | Johnson | 156/180 |
| 3,530,212 | 9/1970 | Kienle et al. | 156/180 |
| 3,556,888 | 1/1971 | Goldsworthy | 156/180 |
| 3,657,040 | 4/1972 | Shobert | 156/180 |

*Primary Examiner*—Daniel J. Fritsch
*Attorney, Agent, or Firm*—Robert J. Schaap

[57] ABSTRACT

An apparatus and method for pultruding a continuously formed elongated non-linear composite article comprised of filament containing reinforcing material and in impregnatable curable matrix. In one embodiment of the apparatus and method, resin impregnated reinforcing material is pulled through a preheating zone and then introduced with respect to a pair of die frames. These die frames are operatively mounted for rotational movement about a main shaft, and respectively carry first and second arcuately shaped die sections which are movable past and cooperate with a fixed die section to form an arcuately shaped die cavity therebetween. The resin impregnated reinforcing material is moved with the first and second die sections during rotation thereof into and through the die cavity where the shape of the die cavity is imparted to the impregnated reinforcing material. A final curing mechanism is associated with the rotatable die frames to cure the matrix in the reinforcing material as it moves through the die cavity to thereby produce a rigid nonlinear pultruded article.

The first and second die frames are initially connected to form a continuous die cavity with the fixed die section. When the first die frame completely passes the fixed die section, it is disconnected from the second die frame and swung around into a position where it is located immediately rearwardly of the first die section in the direction of movement of the reinforcing material. When the second die section completely passes the fixed die section it is likewise swung around to a position immediately rearwardly of the first die section, and these movable die sections will be continuously moved in like manner to form a continuous process.

In a second embodiment of the apparatus and method, resin impregnated reinforcing material is pulled through a preheating zone and then introduced into an initial shaping and forming die. The material is then introduced into an externally heated consolidation and curing die having a die cavity which is curved over its length in the direction of movement of the material. A final cure is imparted to the resin in the reinforcing material in this consolidation and curing die. A pulling mechanism is used to pull the impregnated reinforcing material through the pre-heating zone and the aforesaid dies.

28 Claims, 21 Drawing Figures

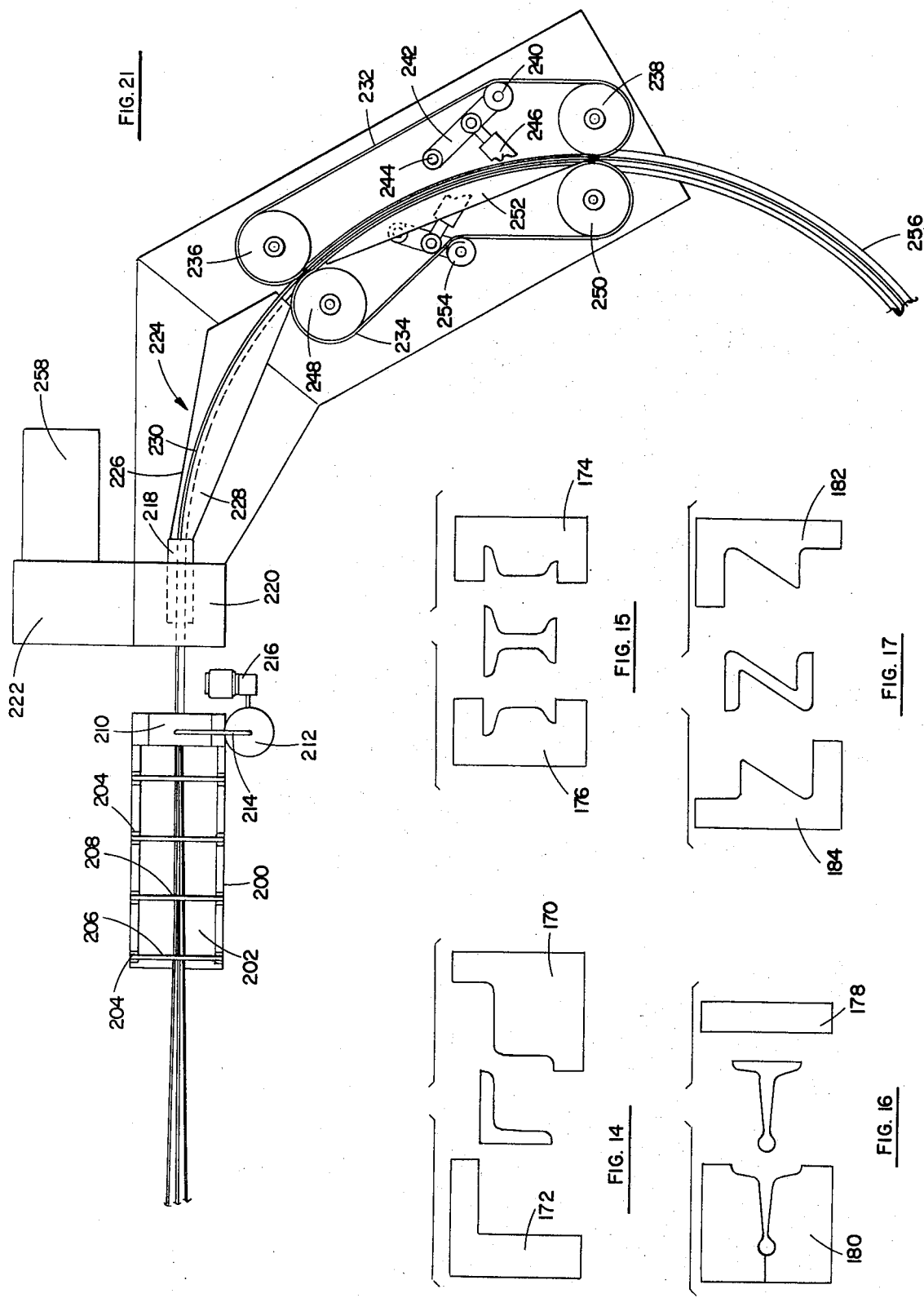

APPARATUS AND METHOD FOR PRODUCING ELONGATED REINFORCED PLASTIC ARTICLES

The invention described herein was made in the performance of work under a NASA contract and is subject to the provisions of section 305 of the National Aeronautics and Space Act of 1958, Public Law 85-568 (72 Stat. 435; 42 U. S. C. 2457).

BACKGROUND OF THE INVENTION

This invention relates in general to certain new and useful improvements in the formation of elongated non-linear reinforced plastic articles, and to an apparatus and a method for producing these reinforced plastic articles through pultrusion techniques.

For several years, various forms of reinforced plastic articles, generally structural articles, have been produced by the technique of pultrusion and include a wide variety of bars, tubes and other profile forms. These articles have found widespread use in widely diversified fields of application, including, for example, electrical, industrial, and structural applications, and even in consumer end products. In fact, due to the relatively low cost of reinforced plastic composite articles, the corrosion resistance attributes, and the very substantial strength-weight ratio afforded by these articles, they have begun to replace counterpart articles typically constructed from metals and other materials.

The pultrusion method and apparatus generally involves the straight pulling of various types of continuous composite reinforcements, such as continuous glass, graphite, or boron, through a resin impregnation system and through a shaping and forming die where the composite composition is cured into its final structural form. In this system, the shaping and forming die, which is linear over its length, generally imparts to the composite, the size and shape of the die and the composite is then cured in this final size and shape as it exits the shaping and forming die. This type of pultrusion system is more fully illustrated and described in U.S. Pat. No. 2,871,911, dated Feb. 3, 1959 and in U.S. Pat. No. 3,556,888, dated Jan. 19, 1971.

The conventional pultrusion systemm is somewhat analogous to extrusion, in that the pultrusion system operates continuously to produce constant-section shapes and profiles, which are generally formed of fibrous-glass and polyester resin. In this type of pultrusion system, the composite article is essentially pulled through the shaping/forming die in a substantially linear path, by means of one or more puller mechanisms, which are located downstream from the shaping/forming die. In this way, the composite article is formed on a continuous basis as a linear profile form. By changing the die shape, it is possible to change the cross-sectional shape and size of the final straight pultruded article.

There have been a number of problems attendant to the use of pultrusion techniques for producing reinforced plastic composite articles. In many of the commercially available pultrusion machines, production quality is not constant and these machines often produce stock of both structurally and aesthetically inferior quality, resulting in high scrap loss. One of the major causes for the poor quality and subsequent rejection of a finished pultruded article results from sloughing which is created by frictional forces within the shaping and forming die tube, which shear the outer resinous surface of the moving composite. This sloughing will cause pieces of cured resin or resin-reinforcement composite to stick to the die tube surface, further resulting in additional scoring of the pultruded article as it moves through the die tube. Consequently, the surface of the subsequently produced pultruded product is increasingly degraded until the point where it becomes necessary to stop the entire operation and purge the die tube.

Other problems which have arisen in connection with the conventional pultrusion process is that of curing the reinforced plastic composite as it moves through the shaping and forming die. Conventional conductive heating and similar forms of heating was found to be satisfactory in effectuating a cure of resin matrix when relatively small diameter cylindrical and like profiles and relatively thin cross-sectional shapes were pultruded through the shaping and forming die. However, in recent years, newer applications for these products has given rise to a requirement for pultruded articles of a fairly thick constant cross-sectional area. This requirement imposed a need for more effective curing in the pultrusion process. However, in order to effectuate a complete cure of the composite mass as it was pulled through the shaping and forming die, the production rates or so-called "running rates" have usually been reduced so that the composite material remained in the die for a longer period of time in order to absorb the necessary heat for curing.

In recent years, it has been recognized that pultruded articles could find use in a wide variety of new applications, particularly in the aerospace industry, due to the strength-weight ration of these composite articles, and the fact that the articles can be produced relatively inexpensively on a mass production basis. However, these new uses require reinforced composite profiles which are non-linear, e.g., curved from end to end, along their length and heretofore, there has not been any successful technique for producing non-linear reinforced composite profiles.

In accordance with the present invention, it has now been found that it is possible to produce pultruded articles formed of reinforced composite materials and which are non-linear over their length. Thus, for example, in accordance with the present invention, it has been found that it is possible to produce pultruded articles which are arcuate in shape, or circular in shape and indeed, it is now possible to produce pultruded articles in the form of helically wound coils. In addition the present invention provides a unique augmented curing system which employs a dielectric preheating zone and a subsequent final curing zone in order to achieve a rapid complete cure of the composite article. Thus, the apparatus of the present invention is not limited in running rates as where the various prior art pultrusion systems.

The apparatus and the method of the present invention which enables the production of non-linear reinforced plastic composite articles rely upon a pair of die frames which are operatively mounted for rotational movement about a main shaft, and these die frames respectively carry first and second arcuately shaped die sections. The die sections move past an arcuately shaped fixed die sectin to form an arcuately shaped draw-die cavity therebetween. As a resin impregnated reinforcing material is pulled through this draw-die cavity with the first and second die sections, during rotation thereof, the shape of the die cavity is imparted to the impregnated reinforcing material. A curing mechanism will permit a cure of the matrix in the reinforcing material as it moves through the draw-die channel to thereby produce the rigid non-linear pultruded article.

It is, therefore, the primary object of the present invention to provide an apparatus for pultruding continuously formed non-linear composite articles which are comprised of the filament containing reinforcing material, and an impregnating curable matrix.

It is another object of the present invention to provide an apparatus of the type stated, which is capable of pultruding a continuously formed non-linear composite article through a pair of cooperating die sections, one of which is movable with respect to the other to form a draw-die shaping and forming cavity therebetween.

It is a further object of the present invention to provide an apparatus of the type stated, which is capable of producing large quantities of pultruded articles on a continuous basis at a relatively low cost.

It is an additional object of the present invention to provide a method for continuously poducing a non-linear composite article by pulling a reinforced plastic composite composition through a die cavity, which is non-linear across its length.

It is also an object of the present invention to provide a method of the type stated, which permits the pultrusion of reinforced plastic composite articles on an automatic continuous basis, thereby requiring a minimal amount of manual attention.

It is yet another object of the present invention to provide an apparatus and method of the type stated for producing pultruded articles which are non-linear across their length utilizing an augmented curing system to provide high production ratios.

It is another salient object of the present invention to provide a reinforced plastic product, which is formed by pultruding the product in an arcuate shape during the formation thereof.

With the above and other objects in view, our invention resides in the novel features of form, construction, arrangement, and a combination of parts presently described and pointed out in the claims.

GENERAL DESCRIPTION

The apparatus and method of the present invention include two embodiments for pultruding a continuously formed non-linear composite articlle comprised of a filament containing reinforcing material and a curable matrix. One of these embodiments utilizes a movable die and a cooperating stationary die to form a die cavity. The other of these embodiments utilizes a stationary die which is formed with a die cavity. However in each case, the die cavity is curved or otherwise non-linear over its length in the direction of movement of the impregnated reinforcing material to produce a non-linear pultruded article. Further, in each case, the impregnated reinforcing material is effectively pulled through the die cavity. In like manner, the matrix is pre-heated in both embodiments in a pre-heating zone and cured in a final curing zone.

In general terms, the apparatus of the present invention can be described as an apparatus for pultruding a continuously formed non-linear composite article comprised of filament containing reinforcing material and an impregnating curable matrix. This apparatus generally comprises pre-heating means operatively located to receive a reinforcing material impregnated with a curable matrix. A forming and shaping die having a die cavity is operatively disposed in relation to said pre-heating means to receive the impregnated and pre-heated reinforcing material. The die cavity is preferably curved over a portion of its length in the direction of movement of the reinforcing material. A final curing means is operatively located with respect to the forming and shaping die and to finally cure the curable matrix impregnated into said reinforcing material, to thereby form a rigid pultruded composite article. Pulling means is also provided for carrying said reinforcing material impregnated with said curable matrix through the pre-heating means and the die cavity of the forming and shaping die.

In one embodiment of the present invention the apparatus can be further characterized in that said apparatus comprises an additional die which is located upstream of said forming and shaping die in the direction of movement of the impregnated reinforcing material and this additional die is also provided with a die cavity to receive the curable matrix impregnated reinforcing material. The forming and shaping die is also curved over a portion of its length in the direction of movement of the reinforcing material. In this aspect of the invention, the forming and shaping die and said second die are fixed with respect to the movement of said reinforcing material.

In another embodiment of the present invention, the apparatus can be further characterized in that the forming and shaping die comprises a second die section and a first die section which moves relative to said second die section and is positionally located to also form a die cavity therebetween to receive the curable matrix impregnated reinforcing material.

In general terms, the last named embodiment of the apparatus of the present invention can be described as comprising a base means with a first die section operatively mounted on the base means, and being sized to receive the reinforcing material and curable matrix comosite. A second cooperating die section is also operatively disposed in relationship to the first die section and is located to form a die cavity therebetween, and this draw-die cavity receives the composite of the reinforcing material and curable matrix.

Means is provided in this apparatus for moving either the first die section or the cooperating die section relative to one another, and which, in turn, carries the reinforcing material and curable matrix therewith, through the die cavity during this relative movement. In addition, curing means is operatively located with respect to at least one of the first die section or the cooperating die section to cure the curable matrix, which is impregnated into the reinforcing material. In this way, it is possible to form a rigid pultruded composite article.

In more detail, this embodiment of the apparatus of the present invention can be characterized in that the first die section is movable with respect to the cooperating die section, and that the cooperating section is, in turn, fixedly located, to thereby form a die cavity when the first die section moves with respect to the fixed cooperating die section. A curing means is carried by at least the first die section or the cooperting die section for curing the matrix impregnated into the reinforcing material as this material passes through the die cavity. In a preferred aspect of the invention, the curing mechanism comprises heater elements located in the movable die section as well as the cooperating die section.

In another preferred aspect of the invention, the first die section and the cooperating die section are curved in the direction of movement of the matrix impregnated reinforcing material so as to form a curved pultruded article. Also, the apparatu may include an additional die section which is mounted on the base means and which moves relative to the cooperating die section and the first die section. This additional die section also moves in relation to the second cooperating die section, and is located to form a die cavity therebetween to receivethe curable matrix impregnated reinforcing material. The first and additional die sections, in this embodiment of the invention, are movable about a common axis on the base means in a circular path.

The reinforcing material which is used in the present invention may be in the form of rovings, that is strands of longitudinally extending filament material, such as glass fibers, boron fibers, or the like. Furthermore, the reinforcing material may exist in the form of tapes, or the material may also comprise filament containing fabric, mat or web material. In this case, the mat or web could be compised of chopped fiber material. In many of the pultruded articles, the reinforcing material would comprise a combination of the filament containing strands or tape and the filament containing fabric, mat or web material.

The apparatus of the present invention can also be characterized in general terms as an apparatus for producing reinforced plastic stock material, and which stock material is comprised of the filament containing reinforcing material, impregnated with a curable matrix. This apparatus can be described as comprising a base means and a first movable die section movable in an arcuate path about an axis on the base means. An additional movable die section is also movable in an arcuate path about the same axis. A stationary die section is locatable in a path to form a die cavity with the first and additional movable die sections. Means, such as motive means, are mounted on this base means for moving the first and additional die sections relative to the stationary die section, and also moving the matrix impregnated reinforcing material through the die cavity. Curing means are again mounted with respect to the first or second die section for curing the matrix during movement through the die cavity, to thereby form a rigid reinforced plastic stock material.

This aspect of the apparatus can be further characterized in that the first and additional movable die sections move in a common plane relative to the stationary die element. In many cases the die sections will move in a relatively horizontal plane, although the apparatus could be constructed so that the die sections move in a relatively vertical plane. In addition, the apparatus comprises motive means for moving the first and additional die sections simultaneously in this common plane relative to the stationary die element. Means are also provided to permit the die sections to be moved in this common plane individually with respect to each other. In this latter aspect of the invention, the first die section is movable with respect to the stationary die section, and the additional of these die sections is movable immediately behind the first die section. As the first die section has completely passed the stationary die section, the additional die sectiodn will become aligned with and cooperate with the stationary die section to form a continuation of the die cavity. Simultaneously therewith, the first of these die sections will be rotated about the common axis so that it is in juxtaposition to and immediately behind the additional die section. In this way, the process can be continued to continuously form a pultruded article.

The method of the present invention can be described in general terms as a method for continuously producing a non-linear composite article comprised of filament reinforcing material, and an impregnated curable matrix. The method also includes two closely related embodiments as aforesaid. This method comprises the contacting of the reinforcing material with the curable matrix and impregnating the matrix into the reinforcing material. Thereafter, the matrix impregnated reinforcing material is introduced into a pre-heating zone to pre-heat the matrix sufficiently to augment a final cure thereof. The pre-heated impregnted reinforcing material is introduced into a die cavity formed by a shaping and forming die which is operatively located with respect to the pre-heating zone, and which die cavity is curved over its length in the direction of movement of the impregnated reinforcing material. Additional heat is applied to the matrix imprengated reinforcing material to finally cure the matrix during the movement of the matrix impregnated reinforcing material into the die cavity to thereby form a non-linear composite article. The matrix impregnated reinforcing material is moved through the pre-heating zone and the die cavity in a non-linear path in the direction of movement of the matrix impregnated reinforcing material.

One embodiment of the method of producing a non-linear composite article can be further characterized in that the shaping and forming die includes a movable die forming element and a stationary die forming element and the method comprises moving the matrix impregnated reinforcing material with the movable die forming element. The other embodiment of the method of producing a non-linear composite article can be further characterized in that the shaping and forming die is fixed and said reinforcing material is pulled through the fixed draw-die cavity.

In the first named embodiment of the method of the invention, the impregnated composite of reinforced material and matrix is introduced into a die cavity formed by a movable die forming element, and a stationary die forming element. The matrix impregnated reinforcing material is moved with the movable die forming element in a non-linear path in the direction of movement of the matrix impregnated reinforcing material. During movement of this matrix impregnated reinforcing material, heat is applied to the material in order to cure the matrix, and to thereby form a non-linear composite article. Thereafter, the composite article thus formed is moved from the cavity.

This embodiment of the method of the present invention can be further characterized in that the matrix impregnated reinforcing material is moved in a circular path with the movable die forming element. As indicated previously, a subsequent or second movable die forming element may also be employed. In this case, the method comprises the introducing of subsequent portions of the matrix impregnated reinforcing material into and through the die cavity formed by the stationary die forming element and a second movable die forming element cooperatively located with respect to the stationary die forming element. Thereafter, heat is also applied to the subsequent portions of the matrix impregnated reinforcing material to cure the subsequent portions during movement thereof, to thereby form a non-linear composite extended portion on the composite article being formed. Finally, the extended portion is also removed from the die cavity.

The first of these movable die forming elements is moved to a position where it is located behind the second die forming element in the direction of movement thereof, to move with still additional subsequent portions of the matrix impregnated reinforcing material, and with respect to the stationary die forming element. In this regard, the reinforcing material may be comprised of any of the reinforcing materials mentioned above, such as the strand material, the fabric, mat or web material, or any combination thereof.

In accordance with this invention, it is possible to produce a reinforced plastic product which is formed by pultruding the product in an arcuate shape during formation thereof. The product is preferably comprised of a filament containing reinforcing material impregnated with a curable resin matrix, and which matrix is cured to a solid form when the reinforcing material is pultruded in an arcuate path in the direction of movement thereof. In this way, it is possible to produce a rigid product, having at least a portion of its length which is arcuately shaped. Generally, the article will be cured over its entire length from end to end.

This reinforced plastic product can be further characterized in that the reinforcing material comprises filament containing strands or otherwise, the product comprises filament containing mat material. In addition, the product in one aspect of the present invention, can comprise a combination of both the mat or strand material, or web material for that matter. In this respect, it is also possible to form the reinforced plastic product with different reinforcing materials, such as for example, boron strand material and glass web material.

FIGURES

Having thus described the invention in general terms, reference will now be made to the accompanying drawings in which:

FIG. 14 is a schematic end elevational view, similar to FIG. 4, and showing a ring die and cooperating fixed die to produce pultruded angle stock;

FIG. 15 is a schematic end elevational view, similar to FIG. 14, and showing a ring die and cooperating fixed die to produce a wide base I-shaped section pultruded stock;

FIG. 16 is a schematic end elevational view, simliar to FIG. 14, and showing a ring die and cooperating fixed die to produce a Tee section pultruded stock with a circular bulb on one end thereof;

FIG. 17 is a schematic end elevational view, similar to FIG. 14, and showing a ring die and a cooperating fixed die to produce a Z shaped section pultruded stock;

FIG. 21 is a top plan view of a modified form of apparatus constructed in accordance with and embodying the present invention for pultruding non-linear composite articles.

DETAILED DESCRIPTION

Figure 20:
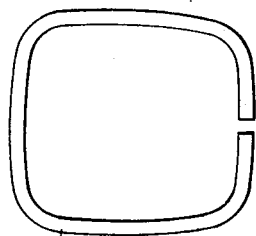
FIG. 20 is a top plan view of a somewhat rectangularly shaped article which can be produced in accordance with the present invention.

Referring now in more detail and by refeence characters to the drawings which illustrate practical embodiments of the present invention, A designates an apparatus for pultruding a continuously formed non-linear composite article, and which is often referred to as a "circular pultrusion" apparatus. The apparatus A generally comprises a base structure 20 including a base plate 22 and a pair of integrally formed spaced-apart upstanding mounting plates 24, which are both reinforced by gussets 26. Fixedly mounted between the spaced-apart upstanding plates 24 is an enlarged support block 27 which suitably retains a fixed uptanding support shaft or so-called "king post" 28.

Figure 3:
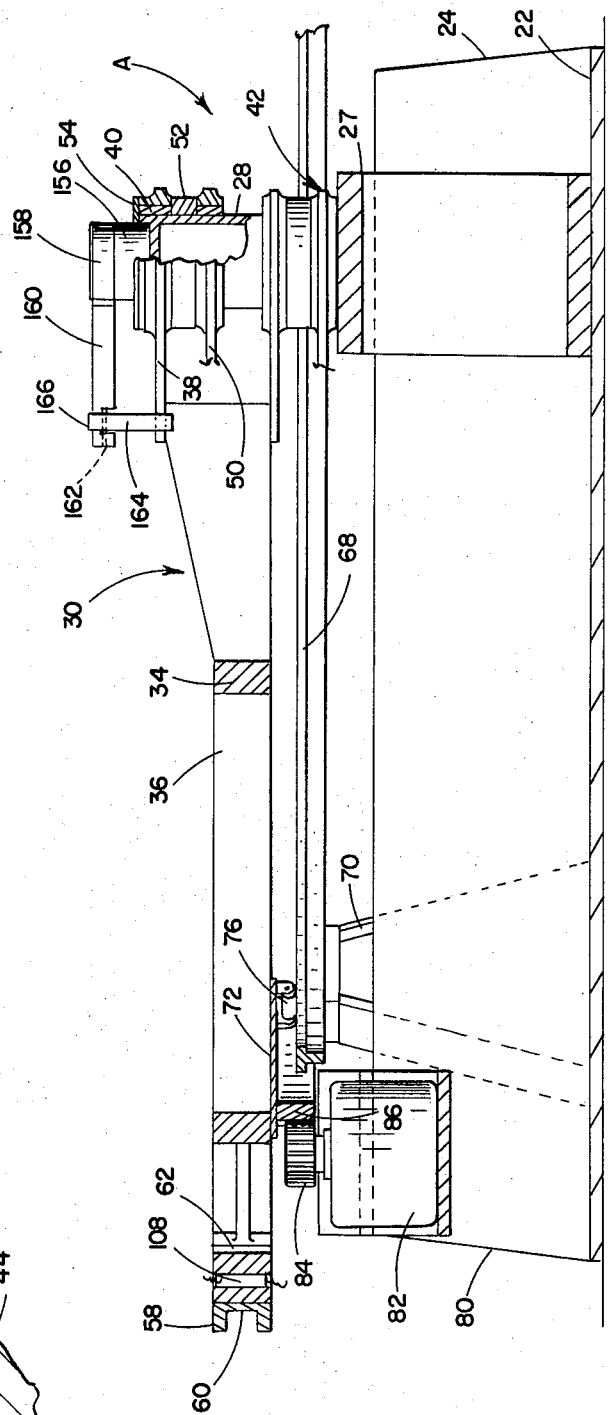
FIG. 3 is a vertical sectional view taken along line 3—3 of FIG. 2, and showing some of the internal components of the apparatus of FIG. 1.

Mounted for rotation about the king post 28 is a first die frame or so-called "sector" or "sector frame" 30, which includes a pair of radially extending support beams 32 which are angularly located with respect to each other at an angle of about 30°. The support beams 32 are connected by a pair of cross braces 34 and angularly located reinforcing struts 36. At its rearward end, the die frame 30 includes a pair of vertically spaced-apart mounting plates 38, which are suitably apertured for rotatable disposition about the king post 28. Bronze bearing rings or similar bearing members 40 are disposed about the king post 28, in the manner as illustrated in FIG. 3.

Figure 1:
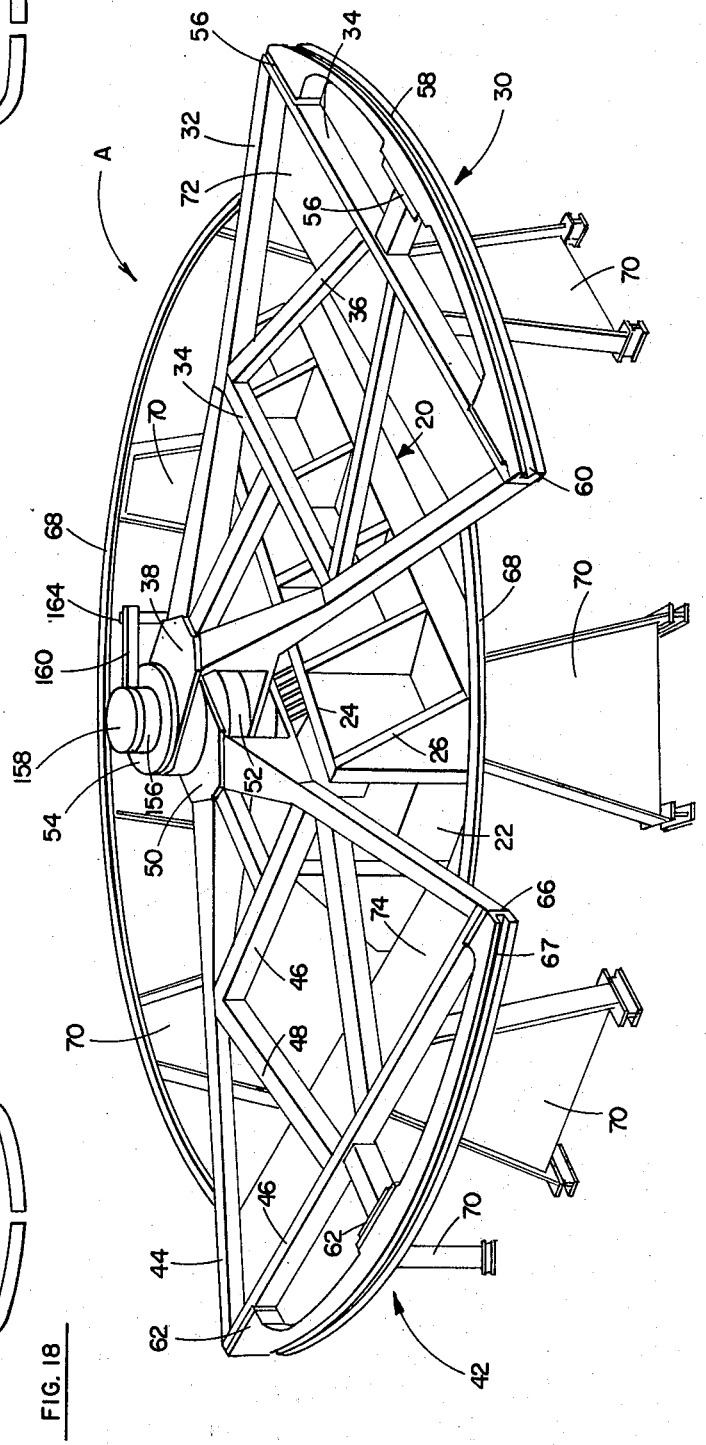
FIG. 1 is a perspective view of an apparatus constructed in accordance with and embodying the present invention for pultruding non-linear composite articles, with certain portions of the apparatus removed for purposes of clarity.

Similarly mounted for rotation about the king post 28 is a second die frame 42 which is similar in its construction to the die frame 30, and includes a pair of radially extending angularly located support beams 44 similarly connected by cross bars 46 and reinforcing struts 48. In like manner, the rearward end of the frame 42 is provided with a pair of vertically spaced-apart mounting plates 50, which are also suitably apertured for rotational mounting upon the king post 28, in the manner as illustrated in FIGS. 1 and 3. In this respect the apertures in the mounting plates are also sized to be disposed over the bronze bearing rings 40 to permit non-binding rotation of the die frame 42 about the king post 28. The mounting plates 38 and 50 are interleaved with respect to each other about the king post 28, in the manner as illustrated in FIG. 3. In addition one or more spacer sleeves 52 are interposed between the various mounting plates 38 and 50. A suitable locking washer or locking nut 54 may be mounted on the upper end of the king post 28 to retain the two die frames 30 and 42 for rotatable movement about the king post 28.

Figures 2, 5, 7:
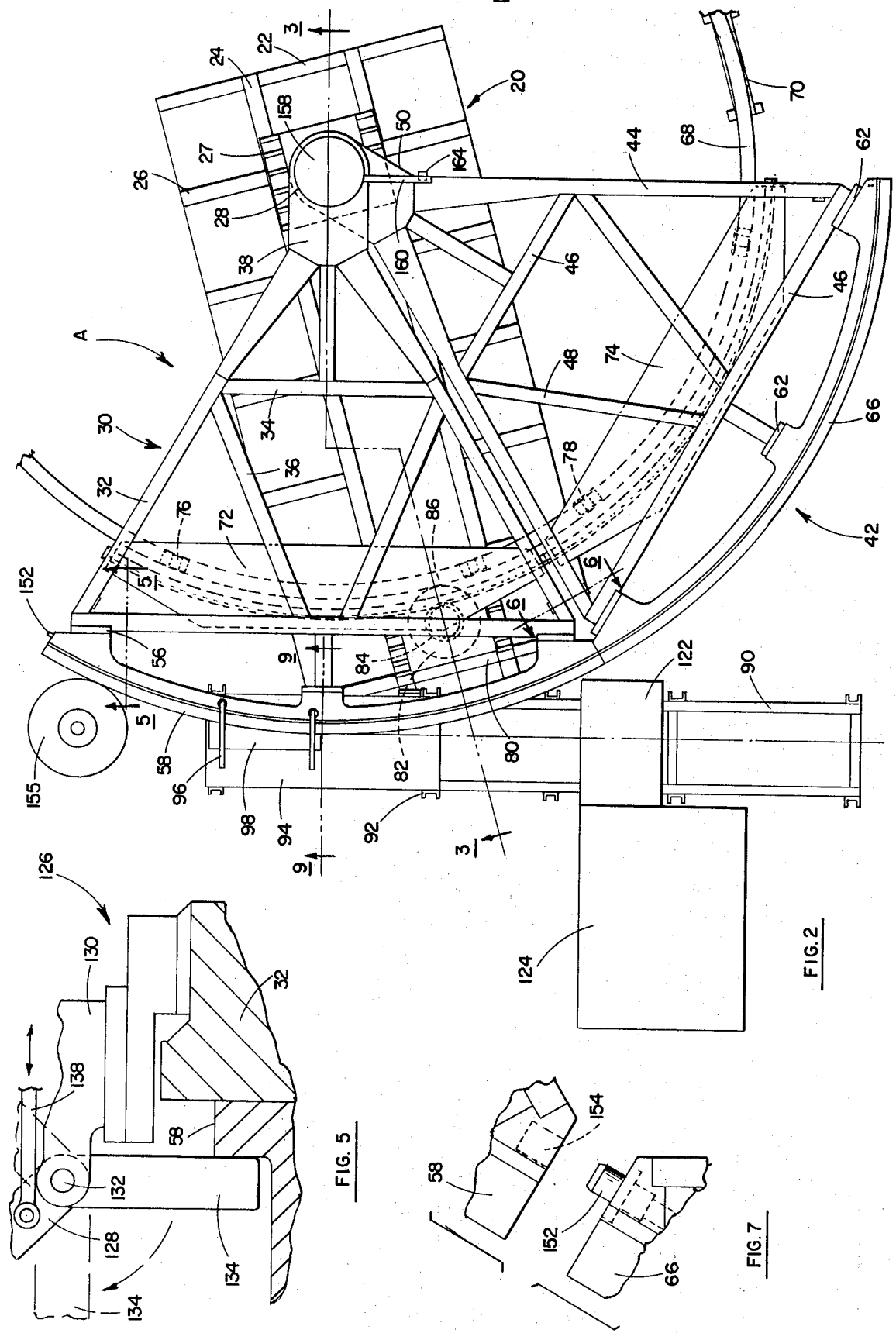
FIG. 2 is a top plan view of the apparatus of FIG. 1, and showing the cooperation between a stationary die and a pair of movable dies forming part of the apparatus of the present invention.
FIG. 5 is a fragmentary vertical sectional view taken along line 5—5 of FIG. 2, and showing one of the die clamps forming part of the apparatus of the present invention.
FIG. 7 is a top plan view of sector alignment and locating pins which form part of the apparatus of FIG. 1.

Projecting outwardly from the outermost cross beam 34 on the die frame 30 are three spaced apart mounting blocks 56, which are located in the same horizontal plane. However, the centrally located mounting block 56 extends outwardly beyond the mounting blocks 56 located at each of the opposite ends of the die frame, in the manner as illustrated in FIG. 2. Provided for removable attachment to the mounting blocks 56 is a first movable die or so-called "ring die" 58. In this particular embodiment of the invention, the ring die 58 functions as a so-called "female die" which is provided with an elongated channel 60, and which in this case is somewhat C-shaped in cross-section. The female die 58 cooperates with a fixed male die, to be hereinafter described, to form a so-called standard "hat-section" die cavity, also to be hereinafter described.

Similarly projecting forwardly from the outermost cross beam 46 on the die frame 42 are three spaced apart mounting blocks 62, which are also located approximately in the same horizontal plane and in addition are located in the same horizontal plane as the mounting blocks 56. Again, the center located mounting block 62 extends forwardly of the two end located mounting blocks 62. Also provided for removable attachment to the mounting blocks 62 is a second movable die or so-called "ring die" 66. In like manner, the ring die 66 will also function as a female die in this embodiment of the invention and is similarly provided with a similar elongated channel 67 which is again C-shaped in horizontal cross-section. By further reference to FIGS. 1 and 3 it can be observed that the two ring dies 58 and 66 are located in the same horizontal plane and are designated to be located in abutting engagement to form a continuous die channel formed of the die channels 60 and 67.

The base frame 20 as well as the die frames 30 and 42 are preferably constructed of any structural metal, such as steel, aluminum, or the like. Generally, the base frame 20 may be cast as an integral unit, or otherwise, it may be constructed from a plurality of welded components. In like manner, the components of the die frames 30 and 42 are preferably welded or otherwise rigidly secured, in order to construct these frames. The dies 58 and 66 are preferably formed of steel and are highly polished to present a relatively smooth die surface. In some cases, these die surfaces may also be coated with a polytetrafluoroethylene material (commercially offered under the trademark Teflon), or like material as desired, in order to present a relatively friction free surface.

The die frames 30 and 42 are further supported during their rotating movement on a circular support rail 68 which extends around the base structure 20 and the support rail 68 is, in turn, retained on a plurality of circumferentially spaced frames 70, in the manner as illustrated in FIG. 1. Bolted or otherwise rigidly secured to the lower surfaces of each of the die frames 30 and 42 are horizontally disposed plates 72 and 74, respectively. Mounted on each of these plates 72 and 74 on each of the respective die frames 30 and 42 are rollers 76 and 78 which are located to ride on the upper surface of the support rail 68. The rollers 76 and 78 are angularly located so that they will follow an arcuate path which is registered with the upper support surface of the support rail 68. In this regard, it should also be observed that the rollers 76 and 78 could be suitably replaced by flat smooth-surfaced shoes or other forms of support members for supporting engagement with the support rail 68.

Also mounted on the base structure 20 is an upstanding drive housing 80, and suitably mounted within the housing 80 is a source of motive power, such as an electric motor or hydraulic motor 82, which, in turn, drives a pinion gear or drive pinion 84, in the manner as illustrated in FIG. 3. Each of the die frames 30 and 42 are provided with depending arcuately shaped gear racks 86 which are located to be moved into meshing engagement with the drive pinion 84. Thus, when the motor 82 is energized, the drive pinion gear 84 will move each of the die frames 30 and 42 in the arcuate path about the king post 28. In this respect, the electric or hydraulic motor 82 would normally be controlled by an operator of the apparatus from an operator's control console (not shown).

By further reference to FIGS. 1 and 2, it can be observed that the two die frames 30 and 42 effectively form segments of a wheel designed for rotatable movement about the king post 28. Thus, the ring dies 58 and 66 will move in a truly circular path as the various die frames 30 and 42 are rotated about the king post 28. In this case, the circular path is located in a relatively horizontal plane. However, it should be understood that the apparatus could be constructed so that the die frames 30 and 42 move in a plane other than a horizontal plane, as for example, a relatively vertical plane.

The base structure 20 extends outwardly beyond the die frames 30 and 42, and rigidly secured to the base structure 20 is an auxiliary support frame 90. The support frame 90, at one end thereof, includes two pairs of spaced apart upstanding legs 92, and mounted to the upper ends of these legs 92 is a horizontally disposed platform 93. Bolted or otherwise rigidly secured to the platform 93 is a mounting block 94. Operatively secured to the mounting block 94, in a manner to be hereinafter described in more detail, is a fixed die 98, and in this embodiment of the invention the fixed die 98 can function as a so-called "male die" to cooperate with the female dies 58 and 66. Operatively carried by the male die 98 are a pair of longitudinally spaced C-shaped brackets 96, and a pair of longitudinally extending vertically spaced straps 97 extend between and connect the two C-shaped brackets 96, also in a manner to be hereinafter described in more detail.

Figure 4:
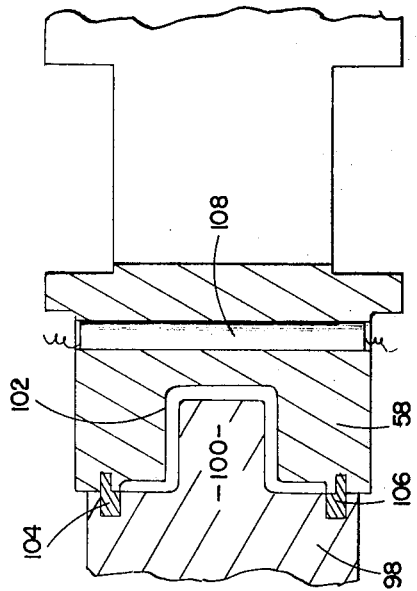
FIG. 4 is a fragmentary vertical sectional view showing the cooperation between a stationary die and one of the movable dies of the present invention to form a draw-die cavity.

The fixed die 98 integrally includes a rectangularly shaped plug 100 which is located on the same horizontal plane as the die channels 60 and 67, as more fully illustrated in FIG. 4. Furthermore, the plug 100 is sized to extend into the channels 60 and 67 of the female dies 58 and 66, respectively, and is slightly smaller than the size of the channels 60 and 67 so as to form a die cavity 102 therebetween. As the movable die frames 30 and 42 pass the fixed die 98 during rotational movement thereof, the plug 100 will extend into the die channels 60 and 67 and will pull the reinforcing material into the die cavity 102, in a manner to be hereinafter described in more detail.

The fixed die 98 includes a pair of vertically spaced outwardly presented shaped seals or gaskets 104 which extend into vertically spaced outwardly presented elongated mating grooves 106 formed in the ring dies 58 and 66 in order to provide for proper alignment of the movable ring dies and the fixed die and to further define the die cavity 102. These seals or gaskets 104 will generally extend for the length of the fixed die 98 and will slide in the grooves 106 as the movable dies 58 and 66 are provided with a series of vertically disposed arcuately spaced cartridge heaters 108 or similar heating elements for reasons to be hereinafter described.

The dies 98, 58 and 66 are only one form of die pair which can be used in accordance with the present invention. Generally any form of die arrangement could be utilized in order to produce the desired cross-sectional shape of the composite article. Furthermore, the size of the various dies could also be altered in order to produce the desired reinforced composite profile size. Thus, for example, the ring die 66 could be provided with a somewhat semi-circular groove which is sized to accommodate a similar arcuately shaped plug on the male die 98 in order to form a somewhat C-shaped draw-die channel. By virtue of the interchangeability of the dies, the pultruded article can be made in any of a wide variety of sizes and shapes, and is only limited by the respective sizes and shapes of the cooperating fixed ring dies.

It has been found in connection with the present invention, that the pultruded article or stock may be, for example, a solid rod stock, strip material, or a hat-shaped bar of the type illustrated in FIG. 4. In addition, tubing and other shapes of appreciable variety may be produced by the apparatus A, and all such shapes will be curved over their length. Several die shapes which may be used with the apparatus A are hereinafter described in more detail. In each case the radius of curvature of the final stock is virtually unlimited and is primarily determined by the radius of curvature of the ring dies and the fixed dies which are employed in the apparatus of the present invention.

The ring dies 58 and 66 have been defined as "female" dies in this specific embodiment of the invention inasmuch as they contain a channel section for their length. In like manner, the fixed die 98 has been defined as a "male" die in this specific embodiment of the invention inasmuch as it contains a plug 100 which fits into the respective channels 60 and 67. However, it should be understood that the shapes of the respective fixed dies and ring dies could be reversed so that in an embodiment of the invention, the fixed die 98 could be provided with a channel sized to receive a plug on each of the ring dies 58 and 66. Thus, the fixed die would function as a female die and the ring dies would function as male dies. With certain die pairs which may be used with the apparatus of the present invention, such as those die pairs hereinafter described in more detail, the dies have matching and mating die faces, which in some cases may be mirror images of each other. Consequently, certain of these die sets do not define a particular male and female die set. Consequently, it should be understood that the term "female" dies and "male" dies as used herein only refers to one form of die set which is used with the apparatus A.

The fixed die 98 and the ring dies 58 and 66 cooperate to form the die cavity 102 as aforesaid. In the particular embodiment of the invention, where the ring dies 58 and 66 are provided with channels and the fixed die 98 is provided with a plug 100, the two dies of this die set cooperate to define a die cavity 102 in the form of a die channel. The seals 104 on the male die 98 will effectively define the upper and lower limits of this die channel. In some cases, this cavity 102 can be defined as a "draw-die cavity" or a "draw-die channel" in the sense that the impregnated reinforcing material is gathered together and accumulated in a higher density composite as it enters the die cavity.

Electrical power is delivered to the cartridge heaters 108 from an external power source under the control of an operator at a central control console (not shown). The base structure will therefore include conductive slip rings and associated components such as brushes and the like (not shown) operatively located about the king post to deliver the electrical power to the heaters 108. This power delivery mechanism would naturally be electrically insulated from the remaining components on the die frames 30 and 42 by conventional insulation techniques.

Figure 8:
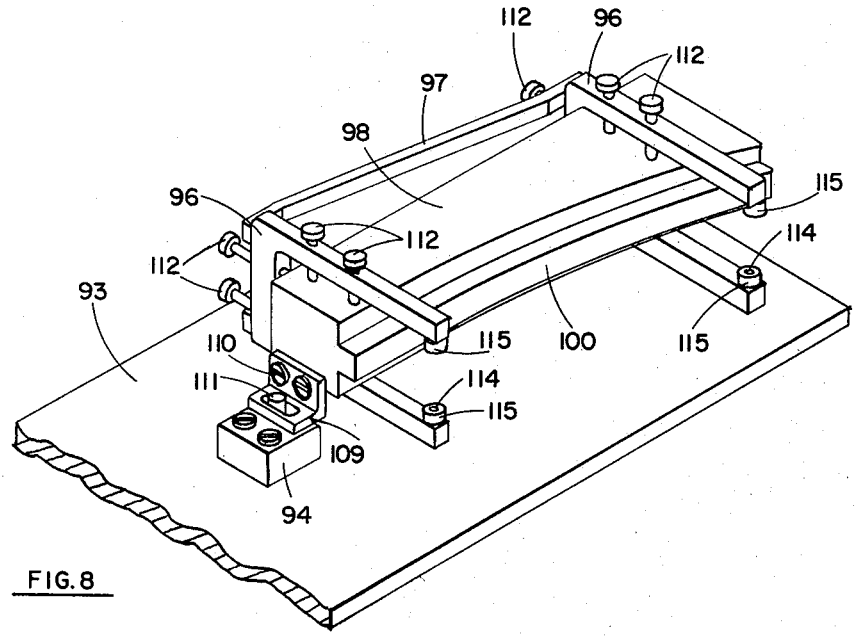
FIG. 8 is a perspective view showing the stationary die and associated structure forming part of the apparatus of FIG. 1 in more detail.
Figure 9:
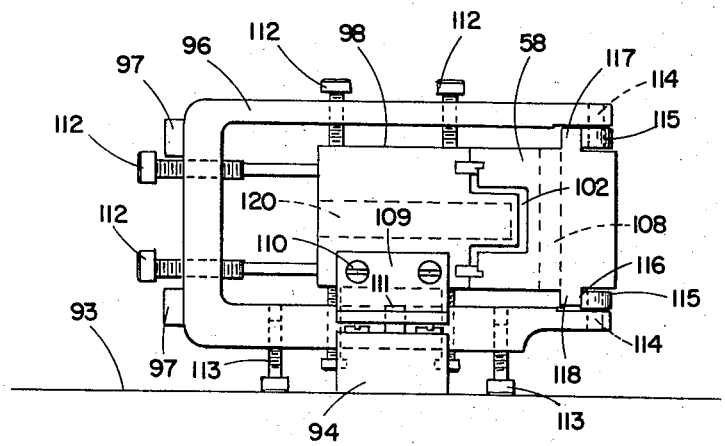
FIG. 9 is an end elevational view of the stationary die structure of FIG. 8, along the left-hand end portion thereof.

The fixed die 98 is secured to the mounting block 94 through an L-shaped retaining bracket 109, the vertical leg of which is bolted to one transverse end of the die 98 by means of bolts 110. The horizontally disposed leg of the retaining bracket 109 is retained on an upstanding pin 111 projecting upwardly from the mounting block 94 and which extends through an elongated aperture formed in the horizontally disposed leg of the bracket 109. The C-shaped brackets 96 are adjustably carried by the fixed die 98 by means of a plurality of adjustment screws 112 which permit adjustable positioning of the brackets 96. Additional adjustment screws 113 extend from the upper surface of the plate 93 into the C-shaped brackets 96 in order to adjustably position the brackets 96, in the manner as illustrated in FIGS. 8 and 9 of the drawings.

The pair of C-shaped brackets 96 are provided at their outer ends with vertically disposed pins 114 for journaling upper and lower guide rollers 115 which function as cam followers. These guide rollers 114 are respectively located to bear against and ride along camming surfaces 116 formed by an upwardly struck flange 117, and a depending lower flange 118 on the inwardly presented faces of the ring dies 58 and 66, in the manner as illustrated in FIG. 8. In this way, the rollers 115 will ride along the camming surfaces 116 as the die frames 30 and 42 pass the fixed die 98 to maintain a relatively constant distance between the fixed die 98 and the ring dies 58 and 66 at the point of tangency. Furthermore, by means of this construction the dimension of the die cavity 102 will be held fairly constant to theeby prevent any non-linearities in the actual formation of the pultruded article.

By means of the above outlined construction it can be observed that the fixed die 98 is retained on the mounting block 94 in such manner that it is capable of shifting slightly with respect to the platform 93 through the action of the upstanding pin 109. The fixed die 98 is initially positioned with respect to the first ring die 58 by means of the various adjustment screws 112, both in vertical plane and in an horizontal plane. In addition, the brackets 96 are also adjustably positioned so that the rollers 115 ride along the camming surfaces 116. The rollers 115 will then ride along the camming surfaces 116 of the ring dies 58 and 66 to maintain a relatively constant cross sectional area of the die cavity 102. In this way, the fixed die 98 cannot separate from the ring dies 58 and 66, but can be automatically adjustably positioned to compensate for any non-linearities in the respective dies across the lengths thereof.

The fixed die 98 may also be provided with one or more cartridge heaters 120 or similar heating elements, which operate in conjunction with the heating elements 108 in the ring dies 58 and 66 to form a final heating environment. These cartridge heaters 120 and the cartridge heaters 108 could be suitably replaced by other forms of heaters as desired or with other forms of curing such as heated fluids, e.g., heated oils, or the like.

Also mounted on the support frame 90, in the manner as illustrated in FIG. 2, is a dielectric pre-heating housing 122, which is located to receive a resin matrix impregnated reinforcing material. The pre-heating housing 122 is provided with a source of dielectric energy from a dielectric energy generator 124. The preheating housing would include an internal resonance cavity and would be properly shielded. By utilizing both the pre-heating which is provided by the pre-heating housing 122, and the final heating environment, provided by the cartridge heaters 108 and 120 in the cooperating ring dies 58 and 66 and the fixed die 98, an augmented cure, similar to that described in U.S. Pat. No. 3,556,888, dated Jan. 19, 1971 can be achieved. It has been found in connection with the present invention, that this augmented curing of a resin matrix impregnated reinforcing material permits a complete cure of the resin matrix without overcuring and also enables substantially higher running rates. In addition, this form of augmented curing significantly increases the scope of raw materials which can be used to form the pultruded product.

The pultruded article can be made from fiber containing strand or tape material. Any of a wide variety of fiber containing web or mat or fabric mateials may also be utilized. The web or tape material may contain chopped fibers. The strand or tape material may be formed of any natural or synthetic continuous filament, which is capable of being bent to conform to a desired shape. The reinforcing material is commercially available in the forms of rolls or spools of these materials. These rolls or spools may be rotatably supported on racks or like structures (not shown) and which are located in close proximity to the apparatus. Furthermore, these racks may be constructed as alternate feed racks to alternately feed various forms of the strand or tape material, or the web or mat or fabric material. However, it should be recognized that boron filaments, graphite tows, filament from lithium and other grown whisker crystals can be employed. In addition, metal wire may even be interspersed with some of the filament materials in the event that it is desired to add some type of metallic body to the final pultruded article. In the actual pultrusion of the reinforced composite articles, a plurality of different reinforcing materials may be employed as hereinafter described in more detail. The exact composition of the final articles will be predicated on the intended use, the size and strength requirements and like factors.

Figure 10:
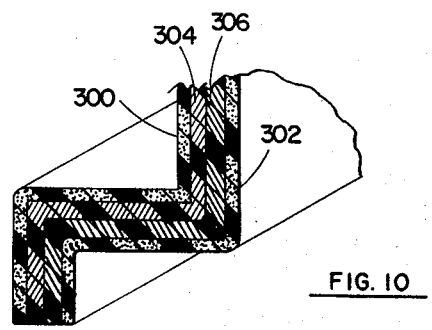
FIG. 10 is a perspective view, partially broken away and in section, of one form of pultraded article produced in accordance with the present invention and showing the interior construction thereof.

One of the most preferred combinations of materials for a pultruded article of so-called hat-shaped cross section is more fully illustrated in FIG. 10 of the drawings. This pultruded article includes outer layers 300 and 302 of longitudinally located filament containing strands. These outer layers 300 and 302 are incidental to inner layers 304 and 306 of angularly located strands, and in this case the strands are located at about a 45° angle with respect to the strands in the layers 300 and 302. It can also be observed that the strands in the layer 304 are located at about a 90° angle with respect to the strands in the layer 306, that is, in a reverse direction to the strands in the layer 306. These strands may be applied in the form of tapes or they can also be introduced in the form of mat material which carries longitudinally located filaments or mat material which carries the angularly located filaments. Again, any other form of combination can be utilized in accordance with the present invention.

These various reinforcing materials, mentioned above, may be impregnated at the side of apparatus A, or they may be commercially purchased in preimpregnated form. In many cases, it will be desirable to impregnate the reinforcing materials during the pultrusion operation in order to obtain better control over the resin impregnation.

The resin matrix impregnating member may be any suitable type of resin matrix impregnator, such as dip tank which merely contains a liquid resin material. In this case, the mat or web material and the strand material are passed into the dip tank during movement to the draw-die channel 102 for resin impregnation of the fibrous elements in these strand, tape and mat or web materials. Otherwise, a resin matrix impregnating canister could also be employed in which the resin matrix material is forceably impregnated into the reinforcing material. The impregnating canister would be designed to forceably introduce the resin matrix into the reinforcing material by pressure, or sonic energy or other forms of driving force. Hollow tubular articles can be made by impregnating the reinforcing material with the resin matrix from the inside of the gathered reinforcing material in tube form.

Any of a number of commercially available resin matrix compositions can be used for impregnating the reinforcing materials such as the strand or mat material. The matrix should be capable at some stage of the process, of being liquefied and softened for a period of time, and also should be sufficient to flow around the filaments forming the strands and the mat and web material. In addition, the matrix should be capable of achieving a rigid state of complete polymerization to become a rigid solid member with the reinforcing material and should also possess ability to adhere to the reinforced material. Some of the suitable thermoplastic resin matrix materials which can be employed for impregnating the reinforcing materials are resins such as polypropylene, polycarbonates, and the like. In addition, some thermosetting resins, such as phenolics, epoxy type resins and various polyesters may also be used. These polyesters are preferably the condensation products from phthalic anhydride, maleic anhydride, ethylene or propylene glycols with a styrene or diallyl phthalate monomer. Generally, the thermosetting resins should be capable of being fused into an insoluble, non-heat softening mass upon application of heat or similar method of triggering the catalytic system. Other binders which may be used are hard waxes, eutectic ceramics, eutectic metals, synthetic rubbers and the like.

In many cases, it may be desirable to introduce a particulate matter into the resin matrix and reinforcing material composite. This particular matter is desirable in some cases in order to provide the desired reinforcing characteristics and even ethestic appearance. The particulate matter can also be used as an economizer in that it reduces the necessary amount of the more costly resin matrix and/or reinforcing material used to make a pultruded product. There are a number of particulate materials which can be employed in the formation of the pultruded articles of the present invention and include, for example, sand, particulate silica, and small hollow spheres of various materials. These articles of the present invention can be produced with a wide variety of particle sizes of the particulate matter, and particularly, large particles in the range of 8 to 64 mesh and smaller particles in the range of 100 mesh to 5 microns. The amount of particulate matter can be programmed according to the amount of strand or tape and mat or web delivery.

As indicated previously, the resin impregnated reinforcing material is pulled through the pre-heating housing 122 where a heating of the resin matrix impregnated into the reinforcing material is initiated. The amount of energy which is introduced into the composite mass is carefully controlled so that a cure of the resin matrix is not completed. In addition, the amount of energy is controlled with respect to the running rates of the feed material, and with respect to the distance between the pre-heating housing 122 and the male die housing 96.

After the material is introduced into the die cavity 102 established by the fixed die 98 and the ring dies 58 and 66, the shape of this die cavity 102 is imparted to the impregnated reinforcing material. Furthermore, the resin matrix impregnated into the reinforcing material will be finally and fully cured while the die cavity 102. By using this type of augmented curing, it has been found that it is not necessary to employ dielectric energy curing in the final curing environment. The dielectric pre-heating has advanced the resin matrix to a point where only a slight amount of additional heat is necessary to completely cure the resin matrix in the final curing.

The dielectric pre-heating mechanism of the present invention will operate with both radio frequency energy and with microwave energy. The radio frequency generator will generate eneregy within a frequency range of approximately 13 megahertz to approximately 100 megahertz, and preferably within the range of approximately 13 meghertz to approximately 82 meghertz. The microwave generator will generate energy within the range of approximately 920 megahertz to approximately 25,000 megahertz, and preferably within the range of approximately 940 megahertz to approximately 5,200 megahertz. Accordingly, the term "dielectric" as used herein will generally refer to both radio frequency energy in the stated frequency range of approximately 13 megahertz to approximately 100 megahertz, and microwave energy in the stated frequency range of approximately 920 megahertz to approximately 25,000 megahertz.

While the theory of microwave and radio frequency curing is not completely understood, it is believed that the curing, in part, occurs by molecular interaction, and particularly, molecular friction. The molecules of the resin have a polar structure, such that when an electrical field is introduced across the molecules of the resin, the molecules will tend to orient in the direction of the field. After release of the field, the molecules will attempt to re-orient back to their original direction. This action is believed to create a frictional effect between the molecules and thereby produce heat in the resin matrix.

Furthermore, the employment of dielectric pre-heating is also believed to be significant in the present invention in that this type of pre-heating enables the initiation of the cure at the center of the mass. In this respect the pre-heating may not generate a cure or even a pre-cure as such since the amount of heat applied is less than that required to cure the resin matrix. However, in the case of the polyesters, for example, a pre-cure may actually be initiated. Therefore the term "pe-heating" may also encompass pre-curing in certain compositions. Inasmuch as the thermal conductivity of the resin fiber composite allows the surface heat to dissipate, the surface of the mass will cool slightly with respect to the remainder thereof. Accordingly, the center of the mass achieves a given temperature prior to the surface of the mass. In this manner, the pre-heating or pre-curing will actually begin from the center of the mass. Accordingly, any outgasing of air which may be entrained in the composite does not create any fissures or cracks.

The ability of the resin matrix to accept the electrical energy is dependent upon the electrical loss tangent of the resin system. Accordingly, the resins are selected with a proper electrical loss tangent for use in the dielectric pre-heating system of the present invention. Generally, these thermosetting resins mentioned above are preferred since they all have the proper electrical loss tangent for use in this system. The resins all have a high electrical loss tangent in the monomeric form, and a low electrical loss tangent in the polymeric form. The electrical loss tangent is actually effected by the dielectric strength of the material, and the heat dissipation factor of the material. In this manner, the preheating or pre-curing process is self limiting, so that the resin matrix essentially cannot be overcured.

It has also been found in connection with the present invention that the use of dielectric pre-heating or pre-curing, along with a final curing as defined herein, enables a substantially higher running rate in the production of the pultruded article. In addition, it has been found in connection with the present invention, that the employment of dielectric pre-heating or pre-curing enables the pultrusion of articles with essentially no cracks or voids, where other heating techniques result in a high loss rate of virtue of inclusion of cracks and voids.

The ring dies 58 and 66 are removably secured to the respective die frames 30 and 42 by means of die clamps 126 which are more fully illustrated in FIG. 5 of the drawings. Generally, two or more die clamps 126 will be located on each of the die frames 30 and 42 to retentively, but nevertheless removably, lock the ring dies 58 and 66 into die cavity forming position. In each case, the die clamps 126 are substantially identical in construction and therefore, only one such die clamp 126 is illustrated and described in detail herein.

These die clamps 126 generally comprise a toggle link mechanism including a handle or actuating arm 128 which is pivotally mounted on an extended support bracket 130 by means of a pivot pin 132. The brackets 130 are rigidly secured to the die frames 30 and 42 in a location where each die clamp 126 is to exist. Integrally formed with the actuating arm 128 in the region of the pivot pin 132 is an angularly struck locking bar 134. When the clamp 126 is in the closed position, as illustrated in the solid lines of FIG. 5, the locking bar 134 will bear against outwardly presented surfaces on the respective ring dies 58 and 66, in the manner as illustrated in FIG. 5.

The actuating arm 128 could effectively function as a manually operable handle in order to individually and manually open each of the die clamps 126. However, in a preferred form of the present invention a shiftable actuating rod 138 will be pivotally connected to the actuating arm 128 and this actuating rod 138 would be connected to a solenoid actuated member, a fluid operated valve, or similar powered mechanism (not shown) for actuation thereby. Thus, when the actuating arm 128 is pulled rearwardly, to the position illustrated in the phantom lines of FIG. 5, either manually or under the control of the actuating rod 138 and powered mechanism, the locking bar 134 will be shifted upwardly to a position also illustrated in the phantom lines of FIG. 5. When the clamps 126 are opened, the ring dies 58 and 66 may be removed from the respective die frames 30 and 42. In this respect, it should be understood that the powered mechanism, such as the solenoid actuated valve, would be operatively connected to the operator control console for automatic actuation to shift the clamps 126 to an open position or closed position under the control of an operator at the operator's control console.

It can be observed that the locking mechanism afforded by the die clamp 126 is quite effective in that it permits a very convenient and rapid removal of the ring dies from their associated die frames. In this way, it is possible to quickly substitute new forms of dies in order to produce a different form or size of pultruded article. The ring dies 58 and 66 may be suitably provided on the inwardly presented faces with pins which would fit into aligned apertures (not shown) for providing correct location of the ring dies 58 and 66 on die frames, and correct registration with the fixed die 98. In this connection, the fixed die 98 is also easily removable from the retaining bracket 109 for substitution of a new fixed die in order to obtain the desired die cavity. It should also be observed that the ring dies 58 and 66 could be secured to the respective die frames 30 and 42 by means of conventional fasteners, such as bolts or the like.

Figure 6:
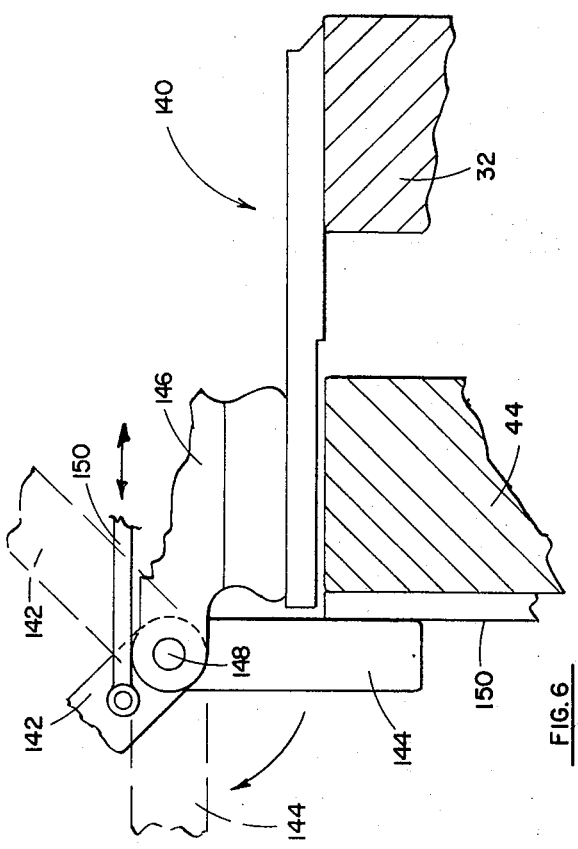
FIG. 6 is a fragmentary vertical sectional view taken along line 6—6 of FIG. 2, and showing one of the sector clamps forming part of the apparatus of the present invention.

In the operation of the apparatus A, the first die frame 30 will carry the ring die 58 mounted for movement therewith, past the fixed or stationary die 98. As the first die frame 30 passes the fixed die 98, the second die frame 42 which is located immediately behind the first die frame 30, in the manner as illustrated in FIG. 2, will then carry the second ring die 66 therewith and past the fixed die 98. The two die frames 30 and 42 are conveniently and removably connected together by means of a sector clamp 140 which is more fully illustrated in FIG. 6 of the drawings. An individual sector clamp 140 would normally be mounted on the support beam 32 of the die frame 30 in the direction of rotation thereof and on the forwardmost support beam 44 of the die frame 42 in the direction of movement thereof. Again, these sector clamps 140 are substantially identical in their construction and therefore only one sector clamp 140 mounted on the support beam 32 of the die frame 30 will be illustrated and described in detail herein.

The sector clamp 140 is somewhat similar in construction to the die clamp 126 and generally comprises a toggle link mechanism which includes a handle or actuating arm 142 and integrally formed angularly struck locking bar 144. This toggle link mechanism is pivotally mounted on a retaining bracket 146 in the region of the integral connection of the actuating arm 142 and the locking bar 144 by means of a pivot pin 148. The retaining bracket 146 would be welded or otherwise rigidly secured to the forwardmost support beams 32 on the frame 30. When the clamp 140 on the die frame 42 is in the closed position as illustrated in the solid lines of FIG. 6, the locking bar 144 will bear against the rearwardly located support beam 32 on the next adjacent die frame 30.

The actuating arm 142 could also effectively function as a manually operable handle in order to individually and manually open the sector clamps 140. However, in the preferred form of the present invention a shiftable actuating rod 150 will be pivotally connected to the actuating arm 142 and this actuating rod 150 would also be connected to a powered mechanism (not shown) of the type described above, such as a solenoid actuated member or a fluid operated valve, for actuation thereby. Thus, when the actuating arm 142 is pulled rearwardly, to the position illustrated in the phantom lines of FIG. 6, either manually or under the control of the actuating rod 150 and powered mechanism, the locking bar 144 will be shifted upwardly to a position also illustrated in the phantom lines of FIG. 6. When the clamp 140 is opened, the two die frames 30 and 42 may be spearated for independent rotatable movement.

It whould also be understood that this latter powered mechanism would be operatively connected to the operator control console in the same manner as the powered mechanism for the die clamps 126 are connected to the operator's control console.

The ring die 66 on the die frame 42 is provided on the forwardly presented transverse end thereof, in the direction of rotation of the frame 42, with an alignment and locating pin 152. The rearwardly presented end of the ring die 58 on the die frame 30 is provided with a receiving socket 154 which is sized and located to receive and accommodate the alignment and locating pin 152, in the manner as illustrated in FIG. 7 of the drawings. In like manner, the forwardly presented transverse end of the ring die 58 on the die frame 30 would also be provided with a like alignment and locating pin 152 which extends into a matching recess 154 fromed in the rearwardly presented transverse end of the ring die 66 on the second die frame 42. It should be observed by reference to FIG. 7 that these sector alignment and locating pins are tapered at their outer end, in order to accurately lead into and snugly fit within the recesses 154. By means of this construction, the two ring dies 58 and 66 can be located in abuttable position, in the manner as illustrated in FIG. 2. In this way, the die faces of the two ring dies will be in complete and accurate alignment. Thus, in the case of the two female dies 58 and 66, the respective die channels 60 and 67 will be in complete alignment.

The fixed die 98 is mounted on the platform 93 in such a position so that the entrant end of the die 98 is located just at the point of tangency of the ring dies 58 and 66 as they pass the fixed die 98. In this respect, the ring dies 58 and 66, along the fixed die 98, will effectively form a die orifice or so-called "draw-die orifice" at the beginning of the die cavity 102 and at the upstream end of the fixed die 98. It can be observed that the resin impregnated reinforcing material which is introduced into the die cavity 102 will initially assume the form of the die cavity 102. Due to the fact that a preheating or pre-curing of the resin matrix has already been initiated, the reinforcing material will maintain the size and shape imparted by the die cavity 102. As the material continues to pass through the die cavity 102, the heat which is generated by the heaters 108 and 120, will impart a sufficient amount of heat to completely cure the resin matrix.

As the die frames 30 and 42 move about the king post 28, the cured impregnated reinforcing material will be pulled past the fixed die 98 and out of the die cavity 102. Thereafter, the leading die frame, such as the die frame 30, is diconnected from the trailing die frame, such as the die frame 42, and swung around to a position where it is trailing the die frame 42. The reinforcing material which is then in a cured hardened state in the form of pultruded stock is continually moved by means of a drive wheel 155 which is located in alignment with the pultruded stock exiting the draw-die channel 102. This drive wheel 155, which is driven by a suitable hydraulic or electric motor or other source of motive power (not shown), will frictionally engage the pultruded stock and urge the stock into tight frictional contact with the respective ring dies so that the stock is effectively pulled through the die cavity 102. The speed of rotation of the drive wheel 155 would be properly controlled to move the pultruded stock at the same rate of speed as the impregnated reinforcing material is introduced into and pulled through the die cavity 102.

For purposes of moving the die frames 30 and 42 about the king post 28, a suitable hydraulic or electric motor 156 or other form of motive power is mounted on the upper end of the king post 28, in the manner as illustrated in FIG. 3. A combination gear reducer and drive mechanism 158 is located on the motor 156 to be driven thereby. The motor 156 is preferably a forward and reverse operating motor to drive the drive mechanism 158 in both forward and reverse directions, for reasons which will presently more fully appear. An outwardly extending arm 160 is connected to and driven by the combination gear reducer and drive mechanism 158. Pivotally mounted on the arm 160 by means of a pivot pin 162 is an actuating bar 164.

The actuating bar 164 integrally includes an upstanding flange 166 which is located to abut against the arm 160 so that the actuating bar can be pivoted in only one direction. As the motor 156 and the drive mechanism 158 are energized to cause the arm 160 to rotate in a clockwise direction, the actuating bar 164 will engage one of the support beams 32 on the frame 30, or one of the support beams 44 on the frame 42 to pull the same in the clockwise direction. When the motor 156 and the drive mechanism 158 are energized to cause the arm 160 to rotate in the counter-clockwise direction, the actuating bar 164, which is pivotal on the arm 160, will be moved over any obstruction, such as the support beams 32 and 44 on the frames 30 and 42, respectively without moving the frames 30 or 42. FIGS. 14 through 17 illustrate various forms of die sets which may be used with the apparatus of the present invention. Thus, FIG. 14 illustrates, in end elevational view, a ring die 170 and a fixed die 172 which cooperate to form a die cavity enabling the pultrusion of angle stock. FIG. 15 illustrates in end elevational view, a ring die 174 and a fixed die 176 which cooperate to form a die cavity which enables the pultruding stock of wide base I-shaped section. In this respect, it should be observed that a true I-shaped section could be formed with the same sized base and top flanges. FIG. 16 illustrates, in end elevational view, a ring die 178 and a fixed die 180 which cooperate to form a die cavity which enables the pultruding of stock with a T-shaped cross-section and having a circular bulb on one end of one leg of the T. Finally, FIG. 17 illustrates, in end elevational view, a ring die 182 and a fixed die 184 which cooperate to form a die cavity which enables the pultruding of stock having a Z-shaped cross-section. In this regard, it should be observed that the fixed die and ring dies could be reversed to produce the same stock. In like manner, and in many cases, the dies could be located in vertically disposed relationship to produce the same stock. Again, the above described die sets are only exemplary and non-limiting number of the die sets which may be used in the present invention, and that any of a wide variety of die sets may be used to pultrude the desired article.

Figure 19:
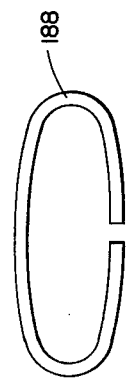
FIG. 19 is a top plan view of a somewhat eliptically shaped article which can be produced in accordance with the present invention.
Figure 18:
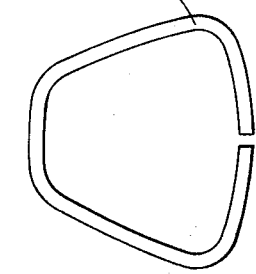
FIG. 18 is a schematic top plan view of a trapezoidal shaped article which can be produced in accordance with the present invention.

FIGS. 18 through 20 illustrate various forms of articles which may be pultruded with the apparatus of the present invention. Thus, in FIG. 18 an article 186 may be pultruded which is somewhat trapezoidal in top plan view. The cross-sectional shape of the article 186, however, may be any of the cross sectional shapes described above, such as hat shaped, Z-shaped or the like. This form of article 186, which is trapezoidal in top plan view, can be produced by pultruding one leg thereof and then by springing the ring die loose and rotating the die out of plane, it is possible to curve the high angled portion thereof, that is the corner portion. Thereafter the next leg can be pultruded. This process is continued until all legs of the article have been pultruded.

FIG. 19 illustrates another form of pultruded article 188 which is somewht eliptical in top plan view. In like manner, FIG. 20 illustrates a further form of pultruded article 190 which is somewht rectangular in top plan view. In each case the corner areas existing between the relatively longer legs thereof are rounded. These articles 188 and 190 may be produced in the same manner as the article 186. Furthermore, the articles 186 and 190 may also have any of the cross-sectional shapes as the article 186. Again, it should be observed that the articles 186, 188 and 190 are only exemplary and a non-limiting number of article forms which may be produced, and that any of a wide variety of article forms may be pultruded in accordance with the present invention.

Figure 11:
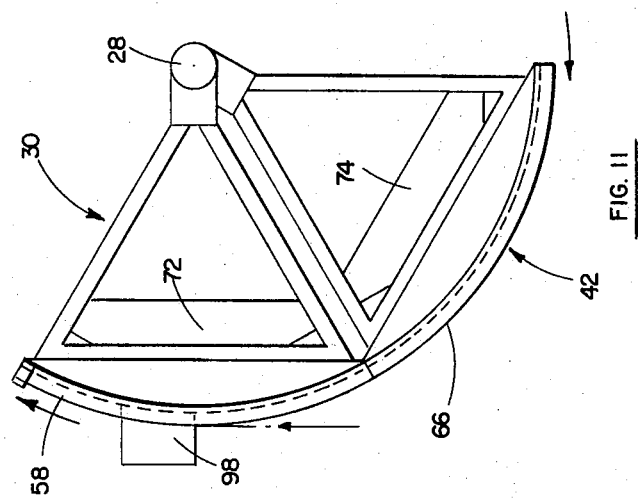
FIG. 11 is a schematic top plan view showing the cooperation of two movable die frames with respect to the stationary die frame.

The operation of the apparatus A has been described above in connection with the description of the construction thereof. However, for further elaboration, the following summary of the operation is set forth. In use and in the actual operation of the apparatus A, the resin matrix impregnated reinforcing material is fixedly attached to the forwardmost end of the die frame 30 in the direction of movement thereof. Furthermore, the impregnated reinforcing material is attached to a position where the reinforcing material will be urged into the die channel 60 or otherwise against the die face of the ring die 58. At this point, the second die frame 42 is also connected to the first die frame 30, in the manner as illustrated in both FIGS. 2 and 11 so that these two die frames will travel together.

As the die frame 30 continues movement in a clockwise direction, reference being made to FIG. 2, the reinforcing material which is attached to the die frame 30, will be pulled from the sources thereof through the pre-heating housing 122. As indicated previously, the reinforcing material will have been pre-impregnated or impregnated at the site of the apparatus just prior to use. This impregnated reinforcing material will then be pulled into and through the die cavity 102 established by the plug 100 on the cooperating fixed die 98 and the die channel 60 in the ring die 58. As the material is pulled through this die cavity 102, the size and shape of the cavity 102, as established by the fixed die 98 and the ring dies 58 and 66, will be imparted to the material, in the manner as previously described.

Figure 12:
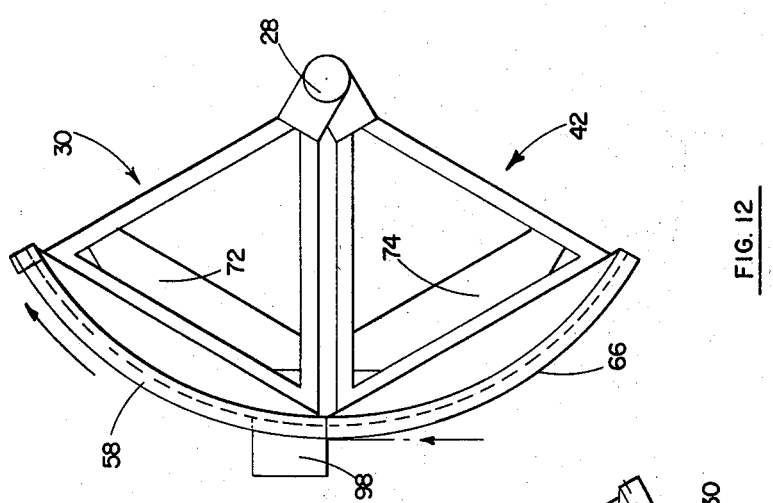
FIG. 12 is a schematic top plan view, similar to FIG. 11, and showing one of the movable die frames passing the stationary die frame.

Continued rotation of the die frames 30 and 42 will cause the die frame 30 to pass beyond the position of the fixed die 98, in the manner as illustrated in FIG. 12. However, it can be observed that as the resin impregnated reinforcing material is carried with the die frame 30, it will also assume the arcuate shape of the ring die 58. At this point, the die frame 42 will be moved into a position where the ring die 66 becomes aligned with and cooperates with the fixed die 98. In this respect, it can be observed that the die faces on the ring dies 58 and 66 will form one matching continuous die surface. In the case of the particular female dies 58 and 66, the die channels 60 and 67 will effectively form one continuous die channel so that the reinforcing material which is carried by the first die frame will continue to pass through the die cavity 102.

Figure 13:
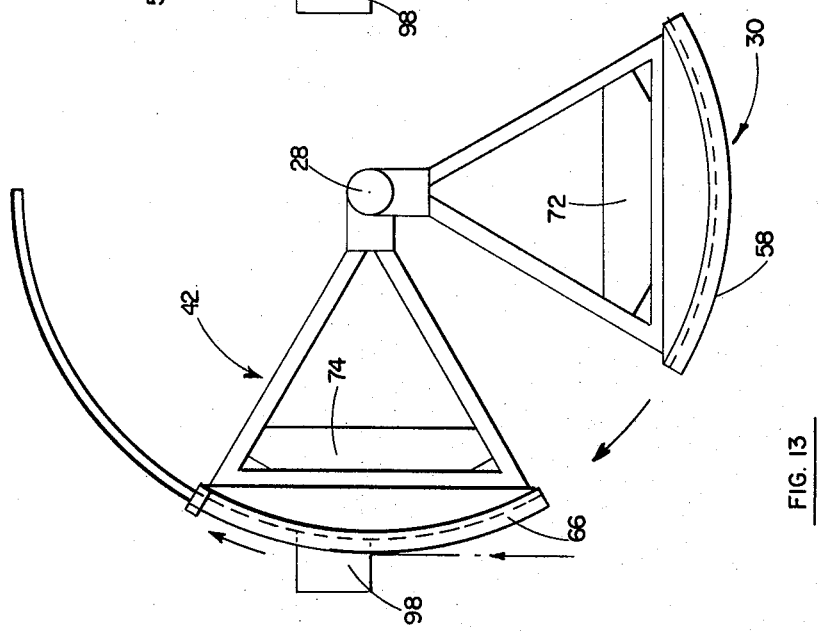
FIG. 13 is a schematic top plan view, similar to FIGS. 11 and 12, and showing one of the movable die frames being shifted to a position where it is immediately behind and in juxtaposition to the other of the movable die frames.

After the first die frame 30 has completely passed the fixed die 98, it will be disconnected from the die frame 42, by opening the sector clamp 140 which holds the two die frames together. The first die frame 30 will then be moved around the king post 28, in the manner as illustrated in FIG. 13, to a position where it will then be located immediately behind and in juxtaposition to the die frame 42. As the die frame 30 reaches a position where it is located immediately behind the die frame 42, in the direction of movement thereof, it will be connected to the die frame 42 by means of the sector clamp 140. The opening and closing of the sector clamps 140 and the energization of the motor 156 to move the die frames 30 and 42 would normally be automatically controlled by a control mechanism forming part of the apparatus A.

As the die frame 42 continues to move in the clockwise direction, it will also pass the fixed die 98, so that the die frame 30 will carry the ring die 58 into alignment with the fixed die 98. Again, the die frame 42, which is now the leading die frame, is then disconnected from the die frame 30 and shifted to a position, about the king post 28, where it is again immediately behind the die frame 30. In this way, it can be observed that the reinforcing material is continuously pulled through the die cavity 102 in an arcuate path to therby form an arcuately shaped pultruded article. This process can continue indefinitely so that, in essence, a complete helically formed coil of the reinforcing material can be pultruded. However, as indicated previously, other forms of articles can also be produced with the above described apparatus and process.

From the foregoing description, it can be observed that the appartus of the present invention is effective to pultrude an article which is curved over its length. In this respect, the article has been defined as being non-linear. While the article may indeed be non-linear in cross section, the term non-linear as used herein refers to the article as being non-linear over its pultruded length. Thus, for example, the curved pultruded article is one form of article which is non-linear over its length.

It is possible to provide a modified form of apparatus B, which is more fully illustrated in FIG. 21. The apparatus B is also capable of pultruding reinforced plastic composite materials in a somewhat arcuate shape, or otherwise, a non-linear shape, and to thereby produce a reinforced plastic article mush in the same manner as the apparatus A.

The apparatus B generally includes a support frame 200, and located on the upper surface thereof is a horizontally disposed platform 202. Mounted on the upper surface of the platform 202 are a plurality of longitudinally spaced laterally extending retainer frames 204, each of which carry a staged web forming plate 206. These plates are designed to receive reinforcing material from a source (not shown) and the reinforcing material may be any of the web or mat reinforcement or the strand or tape reinforcement, or any combination thereof as previously described.

The staged web forming plates 206 each include a central forming aperture 208, and the aperture 208 in each of the plates 206 have a size and shape which progressively assumes the final shape of the pultruded article to be produced. Thus, the first web plate 206 may merely contain a rectangularly shaped aperture in order to receive and gather the reinforcing material which may be accumulated from various sources. The second web forming plate 206 will contain an aperture 208 which initially imparts the overall shape to the reinforcing material, and the subsequent web forming plates will contain apertures of a shape which will more accurately impart the desired cross-sectional shape to the reinforcing material.

Located downstream from the web forming plates 206, in the manner as illustrated in FIG. 14 is a resin matrix impregnating member 210 having an internal chamber which receives a liquid resin matrix from a reservoir 212 through a resin feed line 214. A pump 216 is operatively connected to the reservoir 212 for delivering liquid resin matrix to the resin matrix impregnating member 210 upon demand. The resin matrix which is used in pultruding an article with the apparatus B would be the same as any of those resin matrix compositions described and used in conjunction with the apparatus A. In addition, the resin impregnating chamber would be suitably designed to forceably impregnate the resin material into the reinforcing material, under pressure or by sonic energy, or other means which are known in the art. In many cases, it may be advantageous to locate the resin matrix impregnating member upstream of the staged web forming plates, so that the reinforcing material is impregnated prior to passage through the staged web forming plates.

The liquid resin matrix impregnated reinforcing material is then introduced into a pre-forming/pre-heating die 218 which has a die orifice conforming to the size and shape of the desired pultruded article. The die 218 is preferably made of an electrically non-conductive material, such as Teflon or the like, and is located in a dielectric resonant cavity or chamber 220. A dielectric energy generator 222 is connected to the chamber or cavity 220 for introducing radiation of desired frequency into the chamber 220. In this case, the dielectric energy which is used in the preforming/precuring operation could be the same form of dielectric energy described above, such as the radio frequency energy or the microwave energy.

The pre-heated material which passes through the preforming/pre-heating die 218 is then introduced into an externally heated consolidation and curing die 224 which comprises a pair of die sections 226, and 228 forming an arcuately shaped die cavity 230. The radius of the arcuately shaped die cavity 230 would be determined by the degree of curvature desired in the final pultruded article. Again, the die cavity 230 would have a shape which is similar to that of the desired shape of the final pultruded article. For example, the die cavity 230 could have a size and shape substantially equivalent to the die cavity 102 utilized in the apparatus A.

The externally heated consolidation and curing die 224 would normally be heated by cartridge heaters or heating coils or the like, and in this respect would provide the final curing. Again, it should be understood that this die 224 could also be suitably designed to employ other forms of heating such as heated fluids including heated oil or the like.

The composite which is cured and formed in the externally heated die 224 is pulled through the aforementioned components by means of a pair of drive belts 232 and 234, in the manner as illustrated in FIG. 13. The drive belt 232 is trained around a pair of sprockets or drive rollers 236 and 238, one or both of which is driven by a suitable prime mover, such as a conventional hydraulic or electric motor (not shown). In addition, the drive belt 232 is also trained about an idler roller 240, which is movable on a pivotal link 242, the latter being pivotally secured to a supporting surface by means of a pivot pin 244. The link is urged outwardly by means of a fluid operable ram 246, such as a hydraulic ram, in order to place the desired amount of tension on the drive belt 232.

The drive belt 234 is also trained about a pair of belt sprockets or rollers 248 and 250, one or both of which is driven by a suitable prime mover, such as the aforesaid conventional hydraulic or electric motor. The drive belt 234 is also trained about a radius maintaining shoe block 252, which will maintain the same degree of curvature as the pultruded article received from the externally heated die 224. In like manner, the drive belt 234 may also be trained about an idler roller 254, which is shiftable in the same manner as the idler roller 240 in order to maintain the proper amount of tension on the drive belt 234.

It can be observed that the pultruded article will then pass beyond the drive belts 232 and 234 onto a ramp or other retaining mechanism 256 after it is finally pultruded. The apparatus B may also contain a master control panel 258, which is electrically connected to the aforesaid components for control of each of these components and the entire system. The electrical control circuit which is used in the apparatus B is essentially designed to coordinate the functions of all of the aforesaid components and the design of such a control circuit would be obvious to the skilled artisan. This control system is therefore neither illustrated nor described in any further detail herein.

It can be described that the apparatus B operates in a manner similar to the apparatus A and is effective in producing a pultruded article which may be curved over its length, or which is otherwise non-linear across its length. The apparatus B is effective in certain situations where articles of a fairly wide radius are to be produced in order to eliminate the cost of manufacturing the substantially long female dies. Nevertheless, either of the aforesaid apparatus A or B has been proven to be highly effective in producing the curved pultruded articles.

Thus, there has been illustrated and described a novel appartatus and method for producing elongated pultruded articles as well as novel pultruded articles per-se, and which therefore fulfills all of the objects and advantages sought therefore. Many changes, modifications, variations and other uses and applications of the apparatus and method and the final pultruded article will become apparent to those skilled in the art after considering this specification and the accompanying drawings. Therefore, all such changes, modifications, variations and other uses and applications which do not depart from the spirit and scope of the invention are deemed to be covered by the invention, which is limited only by the following claims.

Having thus described our invention, what we desire to claim and secure by Letters Patent is:

1. Apparatus for pultruding a continuously formed non-linear composite article comprised of filament containing reinforcing material and an impregnating curable matrix, said apparatus comprising:
   a. pre-heating means operatively located to receive a reinforcing material impregnated with a curable matrix,
   b. a forming and shaping die comprising a first and second cooperating die sections which are arcuately curved over their length forming a die cavity therebetween, said die cavity being operatively located in relation to said pre-heating means to receive the impregnated and pre-heated reinforcing material, c. said die cavity being defined by said first and second die sections and curved over the greater portion of its length in the direction of movement of the reinforcing material, d. and curing means operatively located with respect to said forming and shaping die to finally cure the curable matrix impregnated into said reinforcing material, to thereby form a rigid pultruded composite article, e. and pulling means for carrying said reinforcing material impregnated with said curable matrix through said pre-heating means and the die cavity of said forming and shaping die.

2. The apparatus of claim 1 further characterized in that said apparatus comprises an additional die section located upstream of said forming and shaping die in the direction of movement of said impregnated reinforcing material, said additional die also cooperating in the forming of a die cavity to receive the curable matrix impregnated reinforcing material to shape and form said impregnated reinforcing material.

3. The apparatus of claim 2 further characterized in that one die section of said forming and shaping die is fixed with respect to the movement of said reinforcing material.

4. The apparatus of claim 1 further characterized in that said forming and shaping die comprises said second die section which is fixed and said first die section which moves relative to said second die section, and an additional die section movable with respect to said second die section and also being located to also form a die cavity therebetween to receive the curable matrix impregnated reinforcing material.

5. Apparatus for pultruding a continuously formed non-linear composite article comprised of filament containing reinforcing material and an impregnating curable matrix, said apparatus comprising:

a. base means, b. a first die section operatively mounted on said base means and being sized to receive a curable matrix impregnated reinforcing material, c. a cooperating second die section operatively disposed in relation to said first die section and being located to form a die cavity therebetween to receive the curable matrix impregnated reinforcing material, d. said first and second die sections being curved over the greater portion of their lengths in the direction of movement of said matrix impregnated reinforcing material so that said die cavity is curved over the greater portion of its length, e. means for moving one of said first die section and said cooperating die section relative to one another and carrying said curable matrix impregnated reinforcing material therewith through said die cavity during said relative movement, f. and curing means operatively located with respect to at least one of said first die section and second cooperating die section to cure the curable matrix impregnated into said reinforcing material, to thereby form a rigid pultruded composite article.

6. The apparatus of claim 5 further characterized in that said first die section is movable with respect to said second cooperating die section and that said second cooperating die section is fixedly located to form said die cavity when said first die section moves with respect thereto.

7. The apparatus of claim 5 further characterized in that said curing means is carried by at least one of said first die section or said second cooperating die section for curing the matrix impregnated into said reinforcing material as said impregnated reinforcing material passes the stationary one of said first die section or cooperating second die section.

8. The apparatus of claim 6 further characterized in that said first die section and said second cooperating die section are curved in the direction of movement of the matrix impregnated reinforcing material, said second die section having a cavity formed therein to function as a female die and said first die section having a plug thereon to function as a male die and which cavity and plug are curved so as form a curved pultruded article.

9. The apparatus of claim 6 further characterized in that said apparatus comprises an additional die section which is mounted on said base means and moves relative to said second cooperating die section and said first die section, said additional die section also moving in relation to said second cooperating die section and being curved over the greater portion of its length and located to also form a die cavity therebetween to receive the curable matrix impregnated reinforcing material.

10. The apparatus of claim 9 further characterized in that said first and additional die sections move about a common axis on said base means in circular path.

11. The apparatus of claim 5 further characterized in that said reinforcing material comprises filament containing strands.

12. The apparatus of claim 5 further characterized in that said reinforcing material comprises any member selected from the class consisting of filament containing fabric material, filament containing web material, filament containing mat material, filament containing strands, filament containing tapes, and combinations of the foregoing.

13. The apparatus of claim 5 further characterized in that said reinforcing material comprises a combination of filament containing strands and filament mat material.

14. An apparatus for continuously producing a non-linear composite article comprised of filament reinforcing material and an impregnating curable matrix, said apparatus comprising:

a. means for introducing said matrix impregnated reinforcing material into a pre-heating zone to preheat the matrix sufficiently to augment a final cure thereof, b. a die cavity formed by a shaping and forming die operatively located with respect to said pre-heating zone and located to receive the matrix impregnated reinforcing material, and which die cavity is curved over its length in the direction of movement of said material, c. means for introducing additional heat into said matrix impregnated reinforcing material to finally cure the matrix during the movement of said matrix impregnated reinforcing material in said die cavity to thereby form a non-linear composite article, d. and means for moving said matrix impregnated reinforcing material through said pre-heating zone and said die cavity in a non-linear path in the direction of movement of said matrix impregnated reinforcing material.

15. The apparatus for producing a non-linear composite article of claim 14 further characterized in that said shaping and forming die is fixed and said reinforcing material is pulled through the fixed die cavity.

16. The apparatus for producing a non-linear composite article of claim 14 further characterized in that said shaping and forming die includes a movable die forming element and a stationary die forming element and the apparatus comprises means for moving the matrix impregnated reinforcing material with said movable die forming element.

17. An apparatus for continuously producing a non-linear composite article comprised of filament reinforcing material and an impregnating curable matrix, said apparatus comprising:
   a. means for contacting said reinforcing material with said curable matrix and impregnating said matrix into said reinforcing material,
   b. a movable die forming element and a stationary die forming element cooperatively located with respect to said movable die forming element and arranged to form an arcuately shaped die cavity located to receive the matrix impregnated reinforcing material,
   c. pulling means for moving said matrix impregnated reinforcing material with said movable die forming element in a non-linear path in the direction of movement of said matrix impregnated reinforcing material,
   d. means for introducing heat into said matrix impregnated reinforcing material to thereby form a nonlinear composite article,
   e. and said pulling means moving said composite article thus formed from said die cavity.

18. The apparatus for producing a non-linear composite article of claim 17 further characterized in that said movable and stationary die-forming elements are arcuately shaped so that said matrix impregnated reinforcing material is moved in an arcuate path with said movable die forming element.

19. The apparatus of producing a non-linear composite article of claim 17 further characterized in that the apparatus comprises:
   a. an extension of said die cavity formed by said stationary die forming element and an additional movable die forming element cooperatively located with respect to said stationary die forming element to receive subsequent portions of the matrix impregnated reinforcing material,
   b. means for introducing heat into the subsequent portions of said matrix impregnated reinforcing material to cure said subsequent portions during movement thereof to form a non-linear composite extended portion on said composite article being formed,
   c. and said pulling means moving said composite extended portion from said die cavity.

20. The apparatus for producing a non-linear composite article of claim 19 further characterized in that power means moves said first named movable die forming element to a position where it is located behind said additional die forming element in the direction of movement thereof to move with still additional subsequent portions of said matrix impregnated reinforcing material with respect to said stationary die forming element.

21. Apparatus for producing reinforced plastic stock material comprised of a filament containing reinforcing material impregnated with a curable matrix, said apparatus comprising:
   a. base means,
   b. a first movable die section arcuately shaped over at least the greater portion of its length and being also movable in an arcuate path about an axis on said base means,
   an additional movable die section arcuately shaped over at least the greater portion of its length and being also movable in an arcuate path about said axis,
   d. an arcuately shaped stationary die section locatable in a path to form a die cavity with said first and additional movable die sections,
   e. means for moving said first and additional die sections relative to said stationary die section and also moving the matrix impregnated reinforcing material therewith and through said die cavity,
   f. and curing means operatively associated with said first and additional die sections and curing the matrix during movement through said die cavity, to form a rigid reinforced plastic stock material.

22. The apparatus of claim 21 further characterized in that said first and additional movable die sections move in a common relatively horizontal plane relative to said stationary die element.

23. The apparatus of claim 21 further characterized in that said apparatus comprises motive means for moving said first and additional die sections simultaneously in a common plane relative to said stationary die element, and means to permit said first and additional die sections to be moved in said common plane individually with respect to each other.

24. Apparatus for pultruding a continuously formed non-linear composite article comprised of filament containing reinforcing material and an impregnating durable matrix, said apparatus comprising:
   a. receiving means operatively located to receive a reinforcing material impregnated with a curable matrix,
   b. a forming and shaping die comprising a first and second cooperating die sections which are arcuately curved over their length forming a die cavity therebetween, said die cavity being operatively located in relation to said receiving means to receive the impregnated reinforcing material,
   c. said die cavity being defined by said first and second die sections and curved over the greater portion of its length in the direction of movement of the reinforcing material,
   d. and curing means operatively located with respect to said forming and shaping die to finally cure the curable matrix impregnated into said reinforcing material, to thereby form a rigid pultruded composite article,
   e. and pulling means for carrying said reinforcing material impregnated with said curable matrix through said receiving means and the die cavity of said forming and shaping die.

25. The apparatus of claim 24 further characterized in that said apparatus comprises an additional die section located upstream of said forming and shaping die in the direction of movement of said impregnated reinforcing material, said additional die also cooperating in the forming of a die cavity to receive the curable matrix impregnated reinforcing material to shape and form said impregnated reinforcing material.

26. The apparatus of claim 24 further characterized in that one die section of said forming and shaping die is fixed with respect to the movement of said reinforcing material.

27. The apparatus of claim 24 further characterized in that said forming and shaping die comprises said second die section which is fixed and said first die section which moves relative to said second die section, and an additional die section which moves with respect to said second die section and also being located to also form a die cavity therebetween to receive the curable matrix impregnated reinforcing material.

28. The apparatus of claim 24 further characterized in that said filament containing reinforcing material is comprised of a plurality of layers and in which at least one of the layers is formed of a different filament containing material than another layer thereof.

* * * * *